United States Patent
Jopp et al.

(10) Patent No.: US 9,835,332 B2
(45) Date of Patent: Dec. 5, 2017

(54) COMBUSTION CHAMBER ARRANGEMENT

(71) Applicant: ROLLS-ROYCE PLC, London (GB)

(72) Inventors: Lisa Jane Jopp, Derby (GB); Nathan Thomas Willis, Kirkby-in-Ashfield (GB)

(73) Assignee: ROLLS-ROYCE plc, London (GB)

( * ) Notice: Subject to any disclaimer, the term of this patent is extended or adjusted under 35 U.S.C. 154(b) by 826 days.

(21) Appl. No.: 14/458,879

(22) Filed: Aug. 13, 2014

(65) Prior Publication Data

US 2015/0300645 A1   Oct. 22, 2015

(30) Foreign Application Priority Data

Sep. 6, 2013  (GB) .................................. 1315871.2

(51) Int. Cl.
   *F23R 3/00*  (2006.01)
   *F02C 7/18*  (2006.01)

(52) U.S. Cl.
   CPC ............ *F23R 3/005* (2013.01); *F02C 7/18* (2013.01); *F23R 3/002* (2013.01); *F23R 3/007* (2013.01); *F23R 2900/03042* (2013.01); *F23R 2900/03044* (2013.01)

(58) Field of Classification Search
   CPC ............ F23R 3/002; F23R 2900/03042; F23R 2900/03041; F01D 9/023
   See application file for complete search history.

(56) References Cited

U.S. PATENT DOCUMENTS

| 4,242,871 | A | | 1/1981 | Breton |
| 4,485,630 | A | | 12/1984 | Kenworthy |
| 4,901,522 | A | * | 2/1990 | Commaret ................ F23R 3/08 60/752 |
| 5,419,681 | A | | 5/1995 | Lee |

(Continued)

FOREIGN PATENT DOCUMENTS

| EP | 1 666 795 A1 | 6/2006 |
| GB | 2 298 266 A | 8/1996 |

(Continued)

OTHER PUBLICATIONS

United Kingdom Search Report issued in United Kingdom Application No. GB1315871.2 dated Mar. 4, 2014.

(Continued)

*Primary Examiner* — Pascal M Bui Pho
*Assistant Examiner* — Stefan Ibroni
(74) *Attorney, Agent, or Firm* — Oliff PLC

(57) ABSTRACT

A combustion chamber arrangement including an outer wall and an inner wall spaced from the outer wall and the outer wall supports the inner wall. The inner wall including at least one row of circumferentially arranged tiles. At least one tile in the at least one row of tiles having an L, or V, shaped downstream end and the downstream end of the tile in the row of tiles having a first portion extending from the downstream end of the tile towards and sealing with an inner surface of the outer wall and a second portion extending from the first portion in a downstream direction and away from the inner surface of the outer wall. The first portion of the downstream end of the tile having a plurality of apertures to supply coolant over an inner surface of the second portion of the downstream end of the tile.

24 Claims, 4 Drawing Sheets

(56) References Cited

U.S. PATENT DOCUMENTS

| | | | | |
|---|---|---|---|---|
| 5,829,967 | A * | 11/1998 | Chyou | F15D 1/0015 |
| | | | | 431/182 |
| 6,241,468 | B1 | 6/2001 | Lock et al. | |
| 6,679,062 | B2 * | 1/2004 | Conete | F23R 3/60 |
| | | | | 60/753 |
| 7,146,815 | B2 * | 12/2006 | Burd | F23R 3/002 |
| | | | | 60/752 |
| 8,661,826 | B2 * | 3/2014 | Garry | C23C 4/02 |
| | | | | 60/752 |
| 2001/0029738 | A1 | 10/2001 | Pidcock et al. | |
| 2003/0200752 | A1 | 10/2003 | Moertle et al. | |
| 2005/0262846 | A1 | 12/2005 | Pidcock et al. | |
| 2008/0057271 | A1 | 3/2008 | Bunker | |
| 2008/0271458 | A1 | 11/2008 | Ekkad et al. | |
| 2010/0095680 | A1 | 4/2010 | Rudrapatna et al. | |
| 2011/0185739 | A1 | 8/2011 | Bronson et al. | |
| 2011/0302924 | A1 | 12/2011 | Lee et al. | |
| 2012/0111014 | A1 | 5/2012 | Beran et al. | |
| 2013/0108471 | A1 | 5/2013 | Fujimoto | |
| 2015/0159878 | A1 * | 6/2015 | Schildmacher | F23R 3/58 |
| | | | | 60/776 |

FOREIGN PATENT DOCUMENTS

| | | |
|---|---|---|
| GB | 2 356 041 A | 5/2001 |
| GB | 2461897 A | 1/2010 |

OTHER PUBLICATIONS

Feb. 17, 2015 Search Report issued in European Application No. EP 14 18 0839.

* cited by examiner

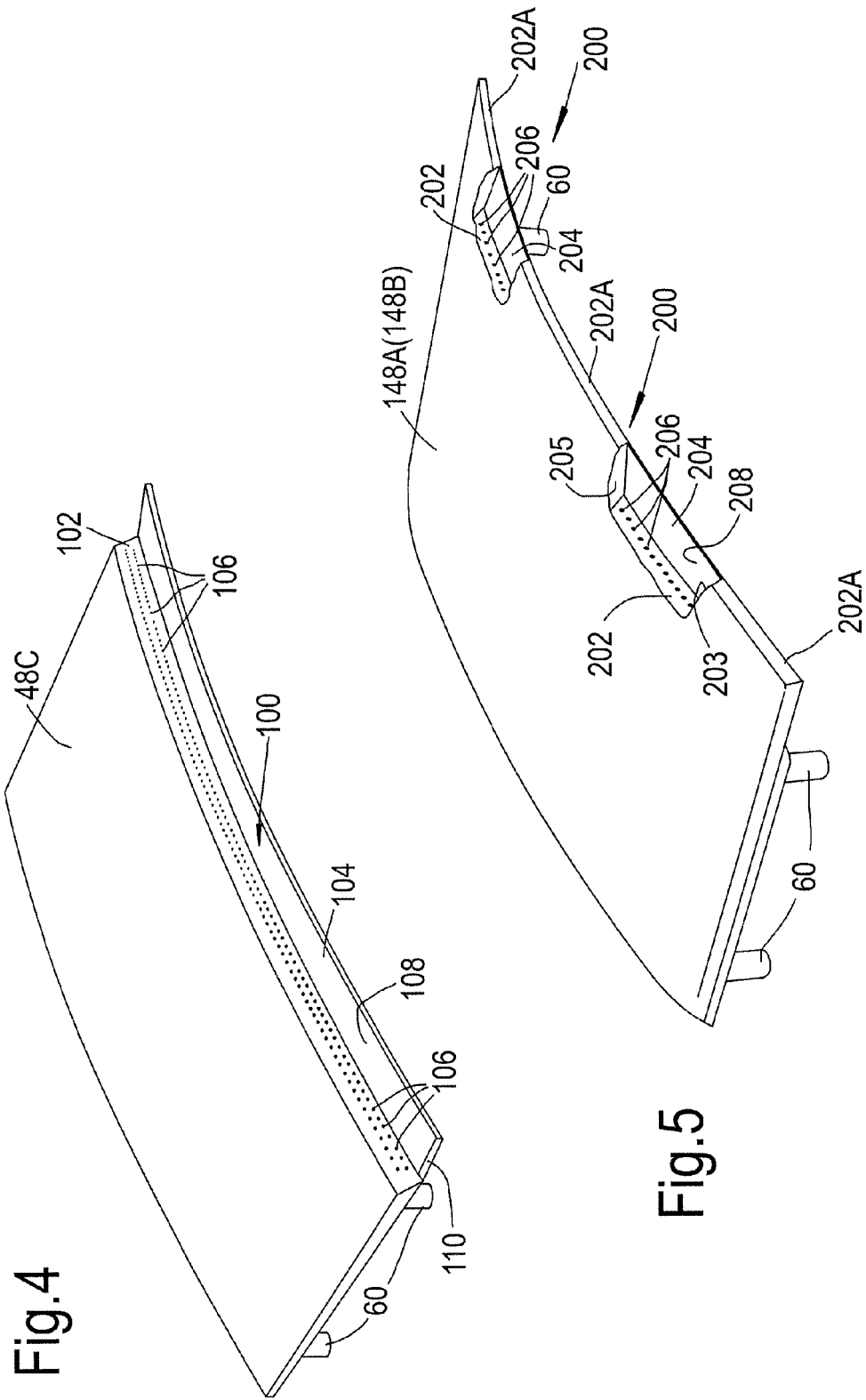

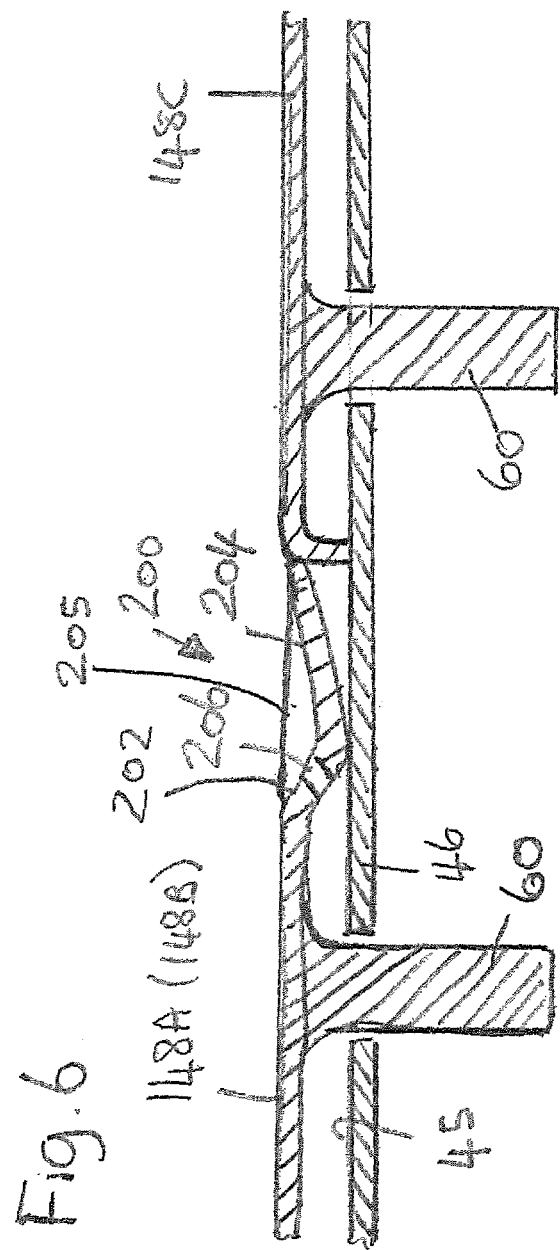

COMBUSTION CHAMBER ARRANGEMENT

FIELD OF THE INVENTION

The present invention relates to a combustion chamber arrangement and in particular to a gas turbine engine combustion chamber arrangement.

BACKGROUND TO THE INVENTION

Gas turbine engine combustion chambers experience extremely high temperatures in operation and the walls of the combustion chambers are generally cooled using a coolant.

It is known to provide combustion chambers comprising an inner wall and an outer wall or combustion chamber comprising segments, or tiles, and in particular the inner wall comprises a plurality of segments, or tiles, supported on the outer wall. The tiles consist of high temperature resistant material, e.g. a nickel base superalloy. The tiles are spaced from the inner surface of the outer wall to provide a passage for coolant. The outer wall of the combustion chamber may have apertures extending there-through to provide impingement cooling of the outer surfaces of the tiles. The tiles may have pedestals projecting from their outer surfaces to provide convection cooling of the tiles. The tiles may have apertures extending there-through to provide film cooling, or effusion cooling, of the inner surfaces of the tiles.

Each tile is generally mounted on the outer wall using studs which are integral with the tile and which extend through mounting apertures in the outer wall. The studs are generally threaded and washers and nuts are fastened onto the studs.

Our US patent U.S. Pat. No. 5,435,139 discloses an outer wall of a combustion chamber with apertures extending there-through to provide impingement cooling of the outer surfaces of the tiles and apertures extending through the tiles to provide film cooling, or effusion cooling, of the inner surfaces of the tiles.

Our US patent U.S. Pat. No. 6,857,275 discloses an outer wall of a combustion chamber with apertures extending there-through to provide impingement cooling of the outer surfaces of the tiles, pedestals projecting from the outer surfaces of the tiles to provide convection cooling of the tiles and apertures extending through the tiles to provide film cooling, or effusion cooling, of the inner surfaces of the tiles.

The upstream end of the outer wall of the combustion chamber is mounted on a combustion chamber casing and the downstream end of the outer wall of the combustion chamber is located in a slot in a discharge nozzle and a plurality of nozzle guide vanes are mounted on the discharge nozzle. In particular, if the outer wall is a radially outer wall of the combustion chamber it is located in a slot in a radially outer discharge nozzle and if the outer wall is a radially inner wall of the combustion chamber it is located in a slot in a radially inner discharge nozzle. The downstream end of the outer wall is generally provided with a machined cooling ring which has an axially extending flange arranged to locate in the slot in the corresponding discharge nozzle. The cooling ring has an axially, or an axially and radially, extending lip arranged generally parallel to the surface of the corresponding discharge nozzle. The cooling ring also has a plurality of apertures extending through the cooling ring to provide a coolant flow between the lip and the associated discharge nozzle to flow over the surface of the associated discharge nozzle and the nozzle guide vanes to protect the associated discharge nozzle and the nozzle guide vanes from the hot gases in the combustion chamber.

This arrangement has several problems. The cooling ring is manufactured from a machined forging, is heavy and is expensive to manufacture. The lip which extends from the cooling ring to direct the coolant from the apertures in the cooling ring over the surface of the discharge nozzle extends beyond the downstream ends of the tiles and hence may be exposed to the hot gases in the combustion chamber and may fail exposing the discharge nozzle to the hot gases in the combustion chamber. The segments, or tiles, with apertures extending there-through to provide film cooling of the inner surfaces of the segments, or tiles, are provided with peripheral walls to form a sealed cavity and these segments, or tiles, are not able to provide a flow of coolant over the lip of the cooling ring without compromising the efficiency of cooling of the segments, or tiles.

Therefore the present invention seeks to provide a novel combustion chamber arrangement which reduces or overcomes the above mentioned problem.

STATEMENTS OF INVENTION

Accordingly the present invention provides a combustion chamber arrangement comprising an outer wall and an inner wall spaced from the outer wall, the outer wall supporting the inner wall, the inner wall comprising at least one row of circumferentially arranged tiles, at least one tile in the at least one row of tiles having a shaped downstream end, the downstream end of the at least one tile in the at least one row of tiles having a first portion extending from the downstream end of the tile towards and sealing with an inner surface of the outer wall and a second portion extending from the first portion in a downstream direction and away from the inner surface of the outer wall, the first portion of the downstream end of the at least one tile having at least one aperture to supply coolant over an inner surface of the second portion of the downstream end of the at least one tile.

Preferably the first portion of the downstream end of the at least one tile has a plurality of apertures to supply coolant over the inner surface of the second portion of the downstream end of the at least one tile.

The first portion and second portion of the shaped downstream end may extend the full circumferential distance of the downstream end of the at least one tile.

The first portion and second portion of the shaped downstream end may extend a predetermined circumferential distance of the downstream end of the at least one tile.

The upstream end of the at least one tile may have a flange extending from the upstream end of the tile towards and sealing with an inner surface of the outer wall and the circumferentially spaced edges of the at least one tile have flanges extending from the circumferentially spaced edges of the tile towards and sealing with an inner surface of the outer wall.

The second portion of the shaped downstream end may extend from the first portion at an angle of 10° to 20° to the inner surface of the outer wall. The second portion of the shaped downstream end may extend from the first portion at an angle of 15° to the inner surface of the outer wall.

The first portion of the shaped downstream end may extend from the downstream end of the tile at an angle of 30° to 90° to the inner surface of the outer wall.

There may be a plurality of rows of apertures in the first portion of the shaped downstream end of the at least one tile. There may be two or three rows of apertures in the first portion of the shaped downstream end of the at least one tile. The apertures in adjacent rows of apertures may be angularly spaced.

The plurality of apertures in the first portion of the shaped downstream end of the at least one tile may be arranged parallel, or at a small angle, to the inner surface of the second portion of the downstream end of the at least one tile.

The downstream end of the outer wall may comprise a projection extending from the downstream end of the outer wall and being arranged to locate in a slot in a discharge nozzle, the discharge nozzle having an inner surface, the at least one row of circumferentially arranged tiles comprising a downstream row of circumferentially arranged tiles, each tile in the downstream row of tiles having a shaped downstream end, the downstream end of each tile in the downstream row of tiles having a first portion extending towards and sealing with the inner surface of the downstream end of the outer wall and the second portion extending from the first portion in a downstream direction and away from the inner surface of the downstream end of the outer wall and substantially parallel with the inner surface of the discharge nozzle, the first portion of the downstream end of each tile in the downstream row of tiles having a plurality of apertures to supply coolant over an inner surface of the second portion of the downstream end of the associated tile and the projection extending from the downstream end of the outer wall having a plurality of apertures to supply coolant to a space between the discharge nozzle and the outer surfaces of the second portions of the downstream ends of each of the tiles in the downstream row of tiles.

The apertures in the projection extending from the downstream end of the outer wall may be arranged to direct coolant onto the outer surfaces of the second portions of the downstream ends of each of the tiles of the downstream row of tiles.

The projection extending from the downstream end of the outer wall may have a first bend and a second bend spaced from the first bend to provide stiffness in the projection.

The projection extending from the downstream end of the outer wall may be formed from sheet metal.

There may be a plurality of axially adjacent rows of tiles.

The outer wall may be a radially inner annular wall of an annular combustion chamber, the discharge nozzle is a radially inner discharge nozzle and the tiles of the inner wall surrounding and being spaced radially from the radially inner annular wall. The outer wall may be a radially outer annular wall of an annular combustion chamber, the discharge nozzle is a radially outer discharge nozzle and the tiles of the inner wall being surrounded by and being spaced radially from the radially outer annular wall.

The first portion and second portion of the shaped downstream end extending a predetermined circumferential distance of the downstream end of the at least one tile may be arranged at a predetermined circumferential position at the downstream end of the at least one tile.

The remainder of the downstream end of the at least one tile may have a flange extending from the downstream end of the tile towards and sealing with an inner surface of the outer wall.

The predetermined circumferential position at the downstream end of the at least one tile may be at a position immediately upstream of a fixing feature of a tile in a row of tiles downstream of the at least one tile. The fixing feature may be a stud extending from the outer surface of the tile and through a mounting aperture in the outer wall or a threaded boss extending from the outer surface of the tile.

Each tile may have apertures extending there-through from an outer surface of the tile to the inner surface of the tile to provide a film of coolant on the inner surface of the tile. Each tile may have pedestals extending from an outer surface of the tile to provide convection cooling of the tile. The outer wall may have apertures extending there-through from an outer surface of the outer wall to an inner surface of the outer wall to provide coolant jets onto the outer surface of the tiles to provide impingement cooling of the tiles.

The combustion chamber may be a gas turbine engine combustion chamber.

BRIEF DESCRIPTION OF THE DRAWINGS

The present invention will be more fully described by way of example with reference to the accompanying drawings, in which:—

FIG. 4 is a further enlarged perspective view of a tile for use at the downstream end of the combustion chamber arrangement shown in FIG. 3.

FIG. 5 is a further enlarged perspective view of a further tile for use in the combustion chamber arrangement shown in FIG. 2.

FIG. 6 is an enlarged cross-sectional view of the downstream end of the further tile of FIG. 5 and the upstream end of an adjacent tile.

DETAILED DESCRIPTION

Figure 1:
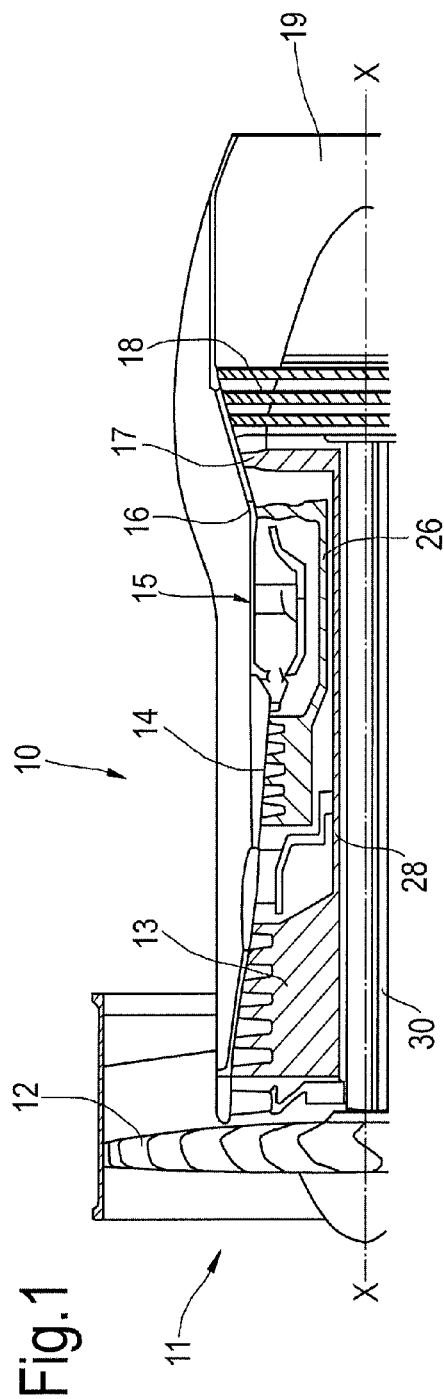
FIG. 1 is partially cut away view of a turbofan gas turbine engine having a combustion chamber arrangement according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
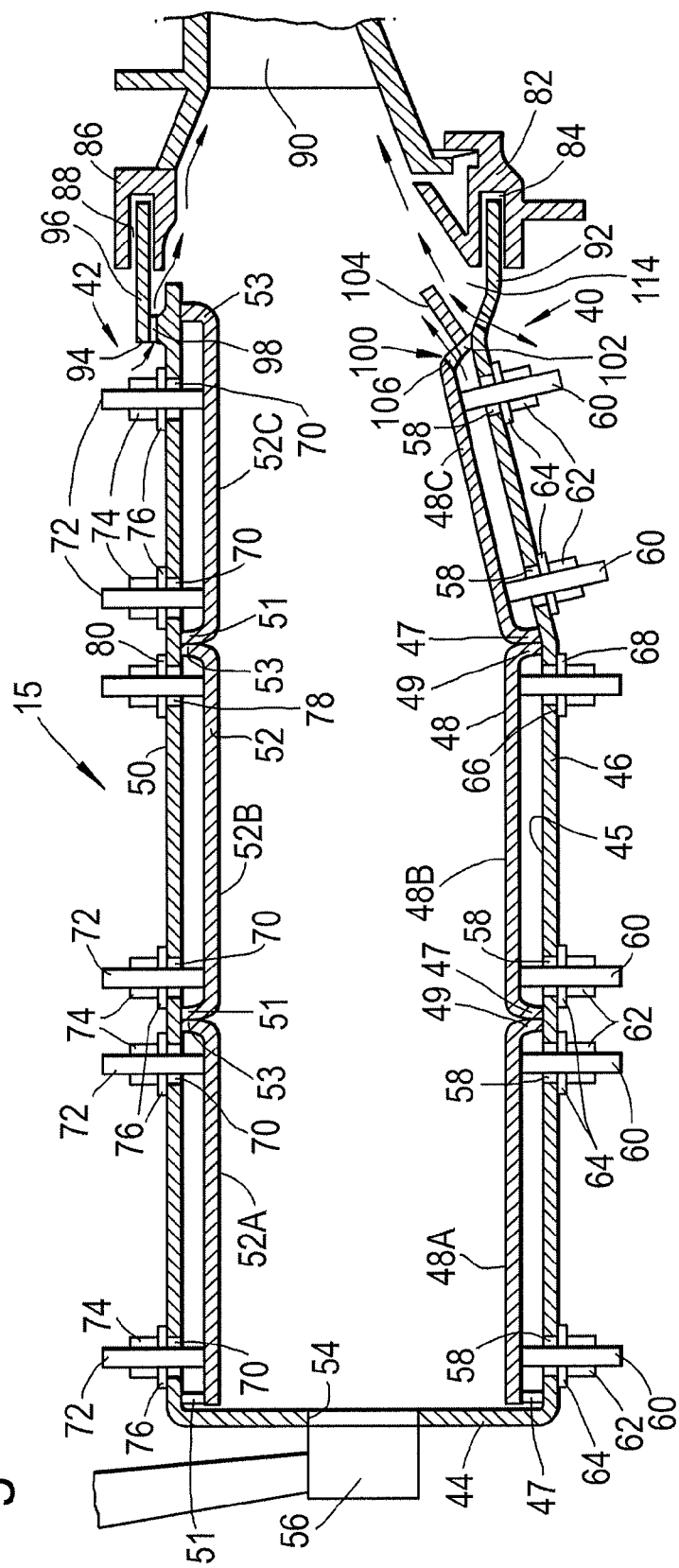
FIG. 2 is an enlarged cross-sectional view of a combustion chamber arrangement according to the present invention.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of fasteners 60 extending radially there-from. Each fastener 60 on the second annular wall 48 extends radially through a corresponding mounting aperture 58 in the first annular wall 46. A cooperating fastener 62 locates on each of the fasteners 60 extending through the mounting apertures 58 in the first annular wall 46. A washer 64 is positioned between each fastener 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of segments, or tiles, 48A, 48B and 48C and the segments, or tiles, 48A, 48B and 48C are arranged circumferentially and axially around the first annular wall 46. The axially extending edges of adjacent segments, or tiles, 48A, 48B and/or 48B may abut each other or may overlap each other and the circumferentially extending ends of adjacent segments, or tiles, 48A, 48B and 48C may abut each other or may overlap each other.

Similarly, the third annular wall 50 has a plurality of mounting apertures 70 extending there-though and the fourth annular wall 52 has a plurality of fasteners 72 extending radially there-from. Each fastener 72 on the fourth annular wall 52 extends radially through a corresponding mounting aperture 70 in the third annular wall 50. A cooperating fastener 74 locates on each of the fasteners 72 extending through the mounting apertures 70 in the third annular wall 50. A washer 76 is positioned between each fastener 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of segments, or tiles, 52A, 52B and 52C and the segments, or tiles, 52A, 52B and 52C are arranged circumferentially and axially adjacent to each other to define the fourth annular wall 52. The axially extending edges of adjacent segments, or tiles, 52A, 52B and/or 52C may abut each other or may overlap each other and the circumferentially extending ends of adjacent segments, or tiles, 52A, 52B and 52C may abut each other or may overlap each other.

The fasteners 60 and 72 on the second and fourth annular walls 48 and 52 are threaded studs which are cast integrally with the segments, or tiles, 48A, 48B, 48C, 52A 52B and 52C or may be secured to the segments, or tiles, 48A, 48B, 48C, 52A, 52B and 52C by welding, brazing etc. The cooperating fasteners 62 and 74 are nuts.

The downstream end of the first annular wall 46 locates in a slot 84 in a radially inner discharge nozzle 82 and the downstream end of the third annular wall 50 locates in a slot 88 in a radially outer discharge nozzle 86. A plurality of nozzle guide vanes 90 are mounted on the radially inner discharge nozzle 82 and the radially outer discharge nozzle 86. The downstream end of the first annular wall 46 has a projection 92 which locates in the slot 84 in the radially inner discharge nozzle 82. The downstream end of the third annular wall 50 has a cooling ring 94 and the cooling ring 94 comprises an axially extending flange 96 which locates in the slot 88 in the radially outer discharge nozzle 86. The cooling ring 94 also has a plurality of apertures 98 to supply coolant in an axially downstream direction over the radially inner surface of the flange 96, over the radially inner surface of the radially outer discharge nozzle 86 and over the radially inner surface of the radially outer platforms of the nozzle guide vanes 90.

The first and third annular walls 46 and 50 form outer walls of the annular combustion chamber 15 and the second and fourth annular walls 48 and 52 form inner walls of the annular combustion chamber 15. The second annular wall 48 comprises at least one row of circumferentially arranged tiles and in this example there are three rows 48A, 48B and 48C of circumferentially arranged tiles and the tiles 48A form an axially upstream row of circumferentially arranged tiles and the tiles 48C form an axially downstream row of circumferentially arranged tiles. Similarly, the fourth annular wall 52 comprises at least one row of circumferentially arranged tiles and in this example there are three rows 52A, 52B and 52C of circumferentially arranged tiles and the tiles 52A form an axially upstream row of circumferentially arranged tiles and the tiles 52C form an axially downstream row of circumferentially arranged tiles.

Figure 3:
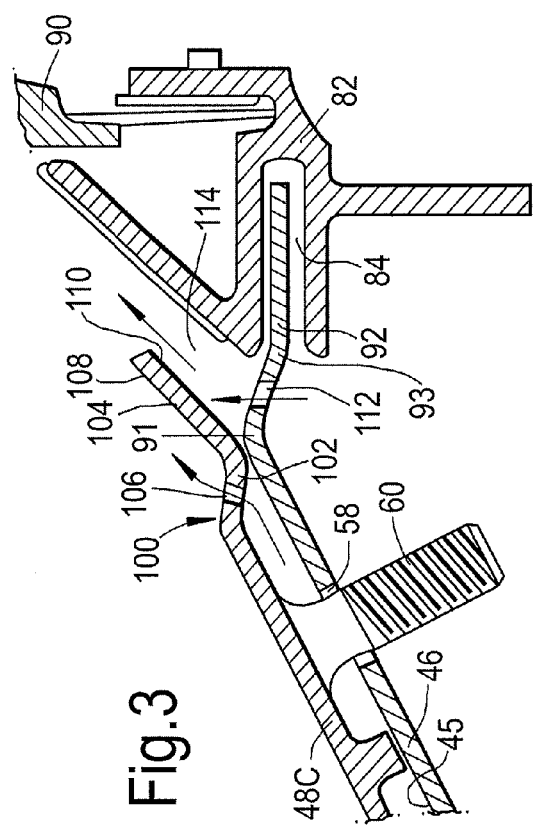
FIG. 3 is a further enlarged cross-sectional view of the downstream end of the combustion chamber arrangement shown in FIG. 2.

Each tile in the downstream row of circumferentially arranged tiles 48C of the second annular wall 48 has an L, or V, shaped downstream end 100 and the downstream end 100 of each tile in the downstream row of tiles 48C has a first portion 102 extends towards and seals with the radially outer surface 45 of the downstream end of the first annular wall 46 and a second portion 104 extends from the first portion 102 in a downstream direction and away from the radially outer surface 45 of the downstream end of the first annular wall 46 and substantially parallel with the radially outer surface of the radially inner discharge nozzle 82, as shown more clearly in FIGS. 3 and 4. It is to be noted that the radially outer surface 45 of the first annular wall 46 is an inner surface of the first annular wall 46 with respect to the annular combustion chamber 15 because it faces towards the combustion zone within the annular combustion chamber 15 and the radially outer surface of the radially inner discharge nozzle 82 is an inner surface of the radially inner discharge nozzle 82 because it faces towards the combustion zone within the annular combustion chamber 15. Thus, the first portion 102 of the L, or V, shaped downstream end 100 extends towards and seals with the inner surface 45 of the downstream end of the outer wall 46 of the annular combustion chamber 15 and the second portion 104 of the L, or V, shaped downstream end 100 extends from the first portion 102 in a downstream direction and away from the inner surface 45 of the downstream end of the outer wall 46 and substantially parallel with the inner surface of the radially inner discharge nozzle 82. The first portion 102 of the L, or V, shaped downstream end 100 of each tile in the downstream row of tiles 48C has a plurality of apertures 106 to supply coolant over a radially outer surface 108 of the second portion 104 of the L, or V, shaped downstream end 100 of the associated tile. The radially outer surface 108 is an inner surface of the tile because it faces the combustion zone within the combustion chamber as discussed previously. The projection 92 extending from downstream end of the first annular wall 46 has a plurality of apertures 112 to supply coolant to a space 114 between the radially inner discharge nozzle 82 and the radially inner surfaces 110 of the second portions 104 of the L, or V, shaped downstream end 100 of each of the tiles in the downstream row of tiles 48C. The radially inner surfaces 110 of the second portions 104 of the L, or V, shaped downstream ends 100 of the tiles 48C are outer surfaces because they face away from the combustion zone within the annular combustion chamber 15. The first portion 102 and the second portion 104 of the L, or V, shaped downstream end 100 of each tile in the downstream row of tiles 48C extends the full circumferential distance of the downstream end of the tile.

The apertures 112 in the projection 92 extending from the downstream end of the first annular wall 46 are arranged to direct coolant onto the radially inner surfaces 110 of the second portions 104 of the L, or V, shaped downstream ends 100 of each of the tiles of the downstream row of tiles 48C. The projection 92 extending from the downstream end of the first annular wall 46 has a first bend 91 and a second bend 93 spaced from the first bend 91 to provide stiffness in the projection 92. The projection 92 extending from the downstream end of the first annular wall 46 is formed from sheet metal, e.g. sheet nickel superalloy. The projection 92 replaces an expensive cooling ring and replicates some of the stiffness provided by the cooling ring and provides a space efficient design for the apertures 112 and provides a regulated gap to the radially outer surface of the radially inner discharge nozzle 82.

The upstream end of each tile 48A, 48B, 48C has a flange 47 extending from the upstream end of the tile towards and sealing with the radially outer surface 45 of the first annular wall 46 and the circumferentially spaced edges of the each tile 48A, 48B and 48C has flanges extending from the circumferentially spaced edges of the tile towards and sealing with the radially outer surface 45 of the first annular wall 46. The downstream end of each tile 48A, 48B has a flange 49 extending from the downstream end of the tile towards and sealing with the radially outer surface 45 of the first annular wall 46. The upstream end of each tile 52A, 52B, 52C has a flange 51 extending from the upstream end of the tile towards and sealing with the radially inner surface of the third annular wall 50 and the circumferentially spaced edges of the each tile 52A, 52B and 52 has flanges extending from the circumferentially spaced edges of the tile towards and sealing with the radially outer surface of the third annular wall 50. The downstream end of each tile 52A, 52B and 52C has a flange 53 extending from the downstream end of the tile towards and sealing with the radially inner surface of the third annular wall 50.

The first annular wall 46 has apertures extending there-through from the radially inner surface to the radially outer surface 45 to provide coolant jets onto the radially inner surfaces of the tiles 48A, 48B and 48C to provide impingement cooling of the tiles. Each tile 48A, 48B and 48C has apertures extending there-through from a radially inner surface of the tile to the radially outer surface of the tile to provide a film of coolant on the radially outer surface of the tile. Each tile may have pedestals extending from a radially inner surface of the tile to provide convection cooling of the tile. The third annular wall 50 has apertures extending there-through from the radially outer surface to the radially inner surface to provide coolant jets onto the radially outer surfaces of the tiles 52A, 52B and 52C to provide impingement cooling of the tiles. Each tile 52A, 52B and 52C has apertures extending there-through from a radially outer surface of the tile to the radially inner surface of the tile to provide a film of coolant on the radially inner surface of the tile. Each tile may have pedestals extending from a radially outer surface of the tile to provide convection cooling of the tile.

The second portion 104 of the L, or V, shaped downstream end 100 extends from the first portion 102 at an angle of 10° to 20° to the downstream end of the radially outer surface 45 of the first annular wall 46. The second portion 104 of the L, or V, shaped downstream end 100 preferably extends from the first portion 102 at an angle of 15° to the radially outer surface 45 of the downstream end of the first annular wall 46. The first portion 102 of the L, or V, shaped downstream end 100 extends from the downstream end of the tile 48C at an angle of 30° to 90° to the radially outer surface 45 of the downstream end of the first annular wall 46.

There is a plurality of rows of apertures 106 in the first portion 102 of the L, or V, shaped downstream end 100 of the downstream row of tiles 48C. In particular there may be two or three rows of apertures 106 in the first portion 102 of L, or V, shaped downstream end 100 of the downstream row of tiles 48C. The apertures 106 in adjacent rows of apertures are preferably angularly spaced. The plurality of apertures in the first portion 102 of the L, or V, shaped downstream end 100 of the downstream row of tiles are arranged parallel, or at a small angle, to the radially outer surface 108 of the second portion 104 of the downstream end 100 of the downstream row of tiles 48C.

In operation the coolant supplied through the apertures 112 in the projection 92 provides a flow of coolant across the surface of the radially inner discharge nozzle 82 and then over the surface of the nozzle guide vanes 90 to provide thermal protection against the high temperatures in the combustion zone of the annular combustion chamber 15. The apertures 112 are arranged to direct the coolant such that it impinges on the radially inner surfaces 110 of the downstream ends 100 of the downstream row of tiles 48C and so that the coolant turns quickly to form a film of coolant as opposed to a plurality of discrete jets of coolant. The coolant supplied through the apertures112 in the projection 92 also provides impingement cooling of the cold side, the radially inner surfaces 110, of the downstream ends 100 of the downstream row of tiles 48C to remove heat from the downstream ends 100 of the downstream row of tiles 48C to prevent oxidation. In addition, if oxidation of the downstream ends 100 of the downstream row of tiles 48C occurs then the coolant supplied from the apertures 112 controls, limits, the length over which oxidation of the downstream ends 100 of the downstream row of tiles 48C will occur.

In operation the downstream ends 100 of the downstream row of tiles 48C form a seal where the first portions 102 abut the radially outer surface of the first annular wall 46 so that coolant is contained in the chambers between the first annular wall 46 and the downstream row of tiles 48C to create a pressure drop for the flow of coolant through the apertures 106 to create a film of coolant on the radially outer surfaces 108 of the second portions 104 of the downstream ends 100 of the downstream row of tiles 48C. The first portions 102 of the downstream ends 100 of the downstream row of tiles 48C may be angled to enable more than a single row of apertures 106. The use of two or more rows of apertures 106 in the first portions 102 of the downstream ends 100 of the downstream row of tiles 48C enables the axes of the apertures 106 in adjacent rows of apertures to be offset by a half pitch to ensure that discrete coolant jets do not leave areas between coolant jets exposed to hot gases. The apertures 106 are arranged at parallel or at an angle close to the radially outer surfaces 108 of the second portions 104 of the downstream ends 100 of the downstream row of tiles 48C. The upstream ends of the second portions 104 of the downstream ends 100 of the downstream row of tiles 48C are moved away from the combustion zone and the film of coolant provided by the apertures 106 adheres to the radially outer surfaces 108 of the second portions 104 of the downstream ends 100 of the downstream row of tiles 48C for longer. The angle of the second portions 104 of the downstream ends 100 of the downstream row of tiles 48C may be chosen to suit the angle of the radially inner discharge nozzle 82.

FIGS. 2, 3 and 4 show an arrangement of a row of circumferentially arranged tiles 48C provided at the downstream end of the combustion chamber 15 in which each tile has an L, or V, shaped downstream end 100 which extends the full circumferential distance of the downstream end of the tile. However, it may be possible to provide these tiles in the upstream row of circumferentially arranged tiles 48A, the other row of circumferentially arranged tiles 48B or in the circumferentially arranged rows of tiles 52A, 52B or 52C. The tiles provided with an L, or V, shaped downstream end 100 may be used in the circumferentially arranged row of tiles 52C if the cooling ring 94 has been replaced at the downstream end of the third annular wall 50 with a projection similar to that provided on the downstream end of the first annular wall 46, e.g. the projection is formed of sheet metal and has first and second bends to provide stiffness etc to the projection. The tiles provided with an L, or V, shaped downstream end 100 may also be used in the circumferentially arranged row of tiles 52C if the apertures 98 in the cooling ring 94 are arranged to direct the coolant onto the radially outer surfaces of the second portions 104 of the L, or V, shaped downstream ends 100 of the tiles.

FIG. 5 shows a tile for a row of circumferentially arranged tiles, in which all of the tiles, a number of the tiles or even a single tile has an L, or V, shaped downstream end. The tile 148A, 148B in FIG. 5 differs from that in FIGS. 2, 3 and 4 in that the first portion 202 and second portion 204 of the L, or V, shaped downstream end 200 extend a predetermined circumferential distance of the downstream end 200 of the tile. In this particular example there are two circumferentially spaced regions with an L, or V, shaped downstream end 200, but there may only be a single region or more than two regions. Each L, or V, shaped downstream end 200 of the tile 148A, 148B has a first portion 202 extending from the downstream end of the tile towards and sealing with a radially outer surface 45 of the first annular wall 46 and a second portion 204 extending from the first portion 202 in a downstream direction and away from the radially outer surface 45 of the first annular wall 46. The first portion 202 of the downstream end 200 tile has a plurality of apertures 206 to supply coolant over a radially outer surface 208 of the second portion 204 of the downstream end 200 of the tile 148A, 148B.

The tile 148A, 148B is similar to the tiles 48C in that the upstream end of the tile 148A, 148B has a flange extending from the upstream end of the tile towards and sealing with a radially outer surface of the first annular wall 46 and the circumferentially spaced edges of the tile 148A, 148B have flanges extending from the circumferentially spaced edges of the tile 148A, 148B towards and sealing with a radially outer surface 45 of the first annular wall 46. The circumferential ends of each of the downstream ends 202 have flanges 203 and 205 extending towards and sealing with the radially outer surface 45 of the first annular wall 46. The remainder of the downstream end 202A of the tile 148A, 148B has a flange extending from the downstream end 202A of the tile 148A, 148B towards and sealing with a radially outer surface 45 of the first annular wall 46. The first portion 202 and second portion 204 of the L, or V, shaped downstream end 202 extending a predetermined circumferential distance of the downstream end of the tile 148A, 148B are generally arranged at a predetermined circumferential position at the downstream end of the tile. The predetermined circumferential position at the downstream end of tile 148A, 148B may be at a position immediately upstream of a fixing feature 60 of a tile 148C in a row of tiles downstream of the tile 148A, 148B as shown in FIG. 6. The fixing feature 60 may be a stud extending from the tile and through a mounting aperture in the first annular wall 46 or a threaded boss extending from the surface of the tile. The fixing feature may also be a separate bolt extending from the tile and through a mounting aperture in the first annular wall 46 or any other suitable fixing feature.

Similarly to the tiles discussed previously each tile 148A, 148B has apertures extending there-through from an outer surface of the tile to the inner surface of the tile to provide a film of coolant on the inner surface of the tile. Each tile may have pedestals extending from an outer surface of the tile to provide convection cooling of the tile. The first annular wall has apertures extending there-through from a radially inner surface of the first annular wall to a radially outer surface of the first annular wall to provide coolant jets onto the radially inner surfaces of the tiles to provide impingement cooling of the tiles.

The apertures in the 106 and 206 in the first portion 102 of the L, or V, shaped downstream end of the, or each tile, may be circular in cross-sectional area, elliptical in cross-sectional area or have any other suitable cross-sectional area. The apertures 106 and 206 in the first portion 102 of the L, or V, shaped downstream end of the, or each tile may have the same cross-sectional area throughout the length of the aperture, or may decrease or increase in cross-sectional area through the length of the aperture. The apertures 106 and 206 in the first portion 102 of the L, or V, shaped downstream end of the, or each tile may for example be fan shaped.

The apertures in the 112 in the projection 92 at the downstream end of the second annular wall 46 or corresponding apertures in a projection at the downstream end of the third annular wall 50 may be circular in cross-sectional area, elliptical in cross-sectional area or have any other suitable cross-sectional area. The apertures in the 112 in the projection 92 at the downstream end of the second annular wall 46 or corresponding apertures in a projection at the downstream end of the third annular wall 50 may have the same cross-sectional area throughout the length of the aperture, or may decrease or increase in cross-sectional area through the length of the aperture. The apertures in the 112 in the projection 92 at the downstream end of the second annular wall 46 or corresponding apertures in a projection at the downstream end of the third annular wall 50 may for example be fan shaped.

Although the present invention has been described with reference to a plurality of apertures in the first portion of the L, or V, shaped downstream end of the tile it may be possible to provide only a single aperture, especially for example if the aperture has a large cross-sectional area, e.g. a slot, or if the L, or V, shaped downstream end of the tile only extends over a predetermined distance of the downstream end of the tile.

Although the present invention has been described principally with reference to the tiles on the first annular wall of the annular combustion chamber it is equally applicable to the tiles on the third annular wall of the annular combustion chamber. The present invention is also applicable to the use of the tiles on the first annular wall and to the use of the tiles on the third annular wall. The outer wall may be a radially inner annular wall, first annular wall, of an annular combustion chamber, the discharge nozzle is a radially inner discharge nozzle and the tiles of the inner wall surrounding and being spaced radially from the radially inner annular wall, first annular wall. Alternatively the outer wall may be a radially outer annular wall, third annular wall, of an annular combustion chamber, the discharge nozzle is a radially outer discharge nozzle and the tiles of the inner wall being surrounded by and being spaced radially from the radially outer annular wall, third annular wall.

Thus, in one arrangement the tiles in FIGS. 2 to 4 are used on the first annular wall, in another arrangement tiles similar to those in FIGS. 2 to 4 are used on the third annular wall, in a further arrangement one or more of the tiles in FIG. 5 are used on the first annular wall, in a different arrangement one or more tiles similar to those in FIG. 5 are used on the third annular wall. In another arrangement the tiles in FIGS. 2 to 4 are used on the first annular wall and tiles similar to those in FIGS. 2 to 4 are used on the third annular wall. In an additional arrangement one or more of the tiles in FIG. 5 are used on the first annular wall and one or more tiles similar to those in FIG. 5 are used on the third annular wall. In another arrangement the tiles in FIGS. 2 to 4 are used on the first annular wall, tiles similar to those in FIGS. 2 to 4 are used on the third annular wall, one or more of the tiles in FIG. 5 are used on the first annular wall and one or more tiles similar to those in FIG. 5 are used on the third annular wall. In other arrangements the tiles in FIGS. 2 to 4 are used on the first annular wall and one or more of the tiles in FIG. 5 are used on the first annular wall and in another arrangement tiles similar to those in FIGS. 2 to 4 are used on the third annular wall and one or more tiles similar to those in FIG. 5 are used on the third annular wall.

Although the present invention has been described with reference to an annular combustion chamber it is equally applicable to a tubular combustion chamber or a tubo-annular combustion chamber. Although the present invention has been described with reference to a gas turbine engine combustion chamber it is equally applicable to other combustion chambers.

The invention claimed is:

1. A combustion chamber arrangement comprising:
an outer wall having an inner surface; and
an inner wall spaced from the outer wall, the outer wall supporting the inner wall via at least one fastener, wherein each fastener of the at least one fastener extends radially through at least one corresponding mounting aperture, the inner wall including at least one row of circumferentially arranged tiles,
wherein at least one tile in the at least one row of circumferentially arranged tiles having a downstream end and a shaped downstream end extending downstream with respect to a flow of combustion gases, the shaped downstream end of the at least one tile in the at least one row of circumferentially arranged tiles having a first portion extending downstream from the downstream end of the at least one tile toward the inner surface of the outer wall and sealing a space between the inner wall and the outer wall, and the shaped downstream end of the at least one tile in the at least one row of circumferentially arranged tiles having a second portion directly extending downstream from the first portion and away from the inner surface of the outer wall and at an angle relative to the inner surface of the outer wall, the first portion of the shaped downstream end of the at least one tile having at least one aperture to supply coolant over an inner surface of the second portion of the shaped downstream end of the at least one tile.

2. The combustion chamber arrangement as claimed in claim 1, wherein the first portion of the shaped downstream end of the at least one tile has a plurality of apertures to supply coolant over the inner surface of the second portion of the shaped downstream end of the at least one tile.

3. The combustion chamber arrangement as claimed in claim 1, wherein the first portion and the second portion of the shaped downstream end extend a full circumferential distance of the at least one tile.

4. The combustion chamber arrangement as claimed in claim 1, wherein the first portion and the second portion of the shaped downstream end extend a predetermined circumferential distance of the at least one tile.

5. The combustion chamber arrangement as claimed in claim 4, wherein the first portion and the second portion of the shaped downstream end extending the predetermined circumferential distance of the at least one tile are arranged at a predetermined circumferential position of the at least one tile.

6. The combustion chamber arrangement as claimed in claim 5, wherein the predetermined circumferential position of the at least one tile is at a position immediately upstream of a fixing feature of a tile in a row of tiles downstream of the at least one tile.

7. The combustion chamber arrangement as claimed in claim 1, wherein the angle is 10° to 20° to the inner surface of the outer wall.

8. The combustion chamber arrangement as claimed in claim 7, wherein the angle is 15° to the inner surface of the outer wall.

9. The combustion chamber arrangement as claimed in claim 1, wherein the first portion of the shaped downstream end extends from the downstream end of the at least one tile at a first portion angle of 30° to 90° to the inner surface of the outer wall.

10. The combustion chamber arrangement as claimed in claim 1, wherein there are a plurality of rows of apertures in the first portion of the shaped downstream end of the at least one tile.

11. The combustion chamber arrangement as claimed in claim 1, wherein the plurality of apertures in the first portion of the shaped downstream end of the at least one tile are arranged parallel to the inner surface of the second portion of the shaped downstream end of the at least one tile.

12. The combustion chamber arrangement as claimed in claim 1, further comprising a plurality of axially adjacent rows of tiles.

13. The combustion chamber arrangement as claimed in claim 1, wherein:
each tile has apertures extending there-through from an outer surface of the tile to the inner surface of the tile to provide a film of coolant on the inner surface of the tile, and
the outer wall has apertures extending there through from an outer surface of the outer wall to an inner surface of the outer wall to provide coolant jets onto the outer surface of the tiles to provide impingement cooling of the tiles.

14. The combustion chamber arrangement as claimed in claim 1, wherein:
each tile has pedestals extending from an outer surface of the tile to provide convection cooling of the tile, and
the outer wall has apertures extending, there-through from an outer surface of the outer wall to an inner surface of the outer wall to provide coolant jets onto the outer surface of the tiles to provide impingement cooling of the tiles.

15. A combustion chamber arrangement comprising:
an outer wall having a projection and an inner surface;
an inner wall, the outer wall supporting the inner wall via at least one fastener, wherein each fastener of the at least one fastener extends radially through at least one corresponding mounting aperture, the inner wall including at least one row of circumferentially arranged tiles, the at least one row of circumferentially arranged tiles including a downstream row of circumferentially arranged tiles; and
a discharge nozzle having a slot and an inner surface, wherein:
the projection extends downstream with respect to a flow of combustion gases from a downstream end of the outer wall, the projection being located in the slot in the discharge nozzle,
each tile in the downstream row of circumferentially arranged tiles having a downstream end and a shaped downstream end, the shaped downstream end of each tile in the downstream row of circumferentially arranged tiles having a first portion extending downstream from the downstream end of each tile toward the inner surface of the outer wall and sealing a space between the inner wall and the outer wall, and the shaped downstream end of each tile in the downstream row of circumferentially arranged tiles having a second portion directly extending downstream from the first portion and away from the inner surface of the outer wall and at an angle relative to the inner surface of the outer wall, and the shaped downstream end extending parallel with the inner surface of the discharge nozzle, the first portion and the second portion of the shaped downstream end of each tile extend a full circumferential distance of the downstream end of each tile, the first portion of the shaped downstream end of each tile in the downstream row of tiles having a plurality of apertures to supply coolant over an inner surface of the second portion of the shaped downstream end of an associated tile of each tile, and
the projection extending from the downstream end of the outer wall, the projection having a plurality of apertures to supply coolant to a space between the discharge nozzle and outer surfaces of each second portion of each downstream end of each of the tiles in the downstream row of tiles.

16. The combustion chamber arrangement as claimed in claim 15, wherein the plurality of apertures in the projection are arranged to direct coolant onto the outer surfaces of the second portions of the downstream ends of each of the tiles of the downstream row of tiles.

17. The combustion chamber arrangement as claimed in claim 15, wherein the projection has a first bend and a second bend spaced from the first bend to provide stiffness in the projection.

18. The combustion chamber arrangement as claimed in claim 15, wherein the projection is formed from sheet metal.

19. The combustion chamber arrangement as claimed in claim 15, wherein:
the outer wall is a radially inner annular wall of an annular combustion chamber relative to a longitudinal engine axis,
the discharge nozzle is a radially inner discharge nozzle relative to the longitudinal engine axis, and
each of the tiles of the inner wall surround and are spaced radially from the radially inner annular wall relative to a longitudinal engine axis.

20. The combustion chamber arrangement as claimed in claim 15, further comprising a plurality of nozzle guide vanes positioned downstream of the discharge nozzle.

21. The combustion chamber arrangement as claimed in claim 15, wherein the slot extends axially into the discharge nozzle and the projection extends axially away from the outer wall.

22. The combustion chamber arrangement as claimed in claim 15, wherein:
the first portion of the shaped downstream end extends from the downstream end of the tile inner wall tile at a first portion angle of 30° to the inner surface of the outer wall, and
the angle of the second portion is 15° to the inner surface of the outer wall.

23. A combustion chamber arrangement comprising:
an outer wall having an inner surface, and
an inner wall spaced from the outer wall, the outer wall supporting the inner wall via at least one fastener, wherein each fastener of the at least one fastener extends radially through at least one corresponding mounting aperture,
the inner wall including at least one row of circumferentially arranged tiles, wherein at least one tile in the at least one row of circumferentially arranged tiles having a downstream end and a shaped downstream end extending downstream with respect to a flow of combustion gases, the shaped downstream end of the at least one tile in the at least one row of circumferentially arranged tiles having an L-shape or a V-shape, the shaped downstream end of the at least one tile in the at least one row of tiles having a first portion extending downstream from the downstream end of the at least one tile toward the inner surface of the outer wall and sealing a space between the inner wall and the outer wall, and the shaped downstream end of the at least one tile in the at least one row of circumferentially arranged tiles having a second portion directly extending downstream from the first portion and away from inner surface of the outer wall and at an angle relative to the inner surface of the outer wall, the first portion of the shaped downstream end of the at least one tile having at least one aperture to supply coolant over an inner surface of the second portion of the shaped downstream end of the at least one tile.

24. The combustion chamber arrangement as claimed in claim 23, wherein:
the first portion of the L-shaped downstream end of each tile extends from the downstream end of the at least one tile at a first portion angle of 30° to 90° to the inner surface of the outer wall, and the angle of the second portion is 10° to 20° to the inner surface of the outer wall.

* * * * *